Sept. 29, 1936. A. P. BALL 2,055,889
VEHICLE TOP CONSTRUCTION
Filed Sept. 26, 1932 2 Sheets-Sheet 2
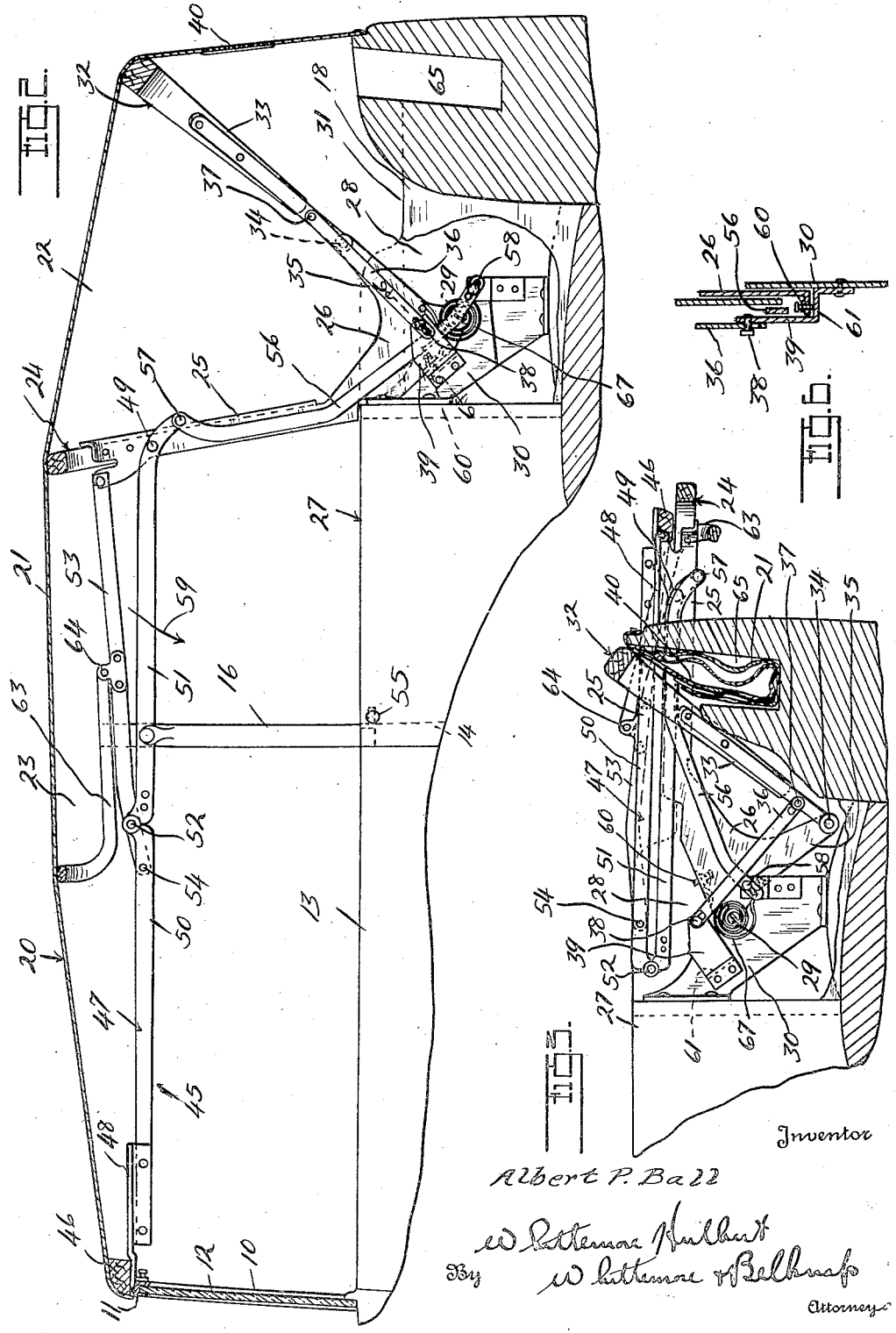
Inventor
Albert P. Ball
By [signatures]
Attorney Patented Sept. 29, 1936

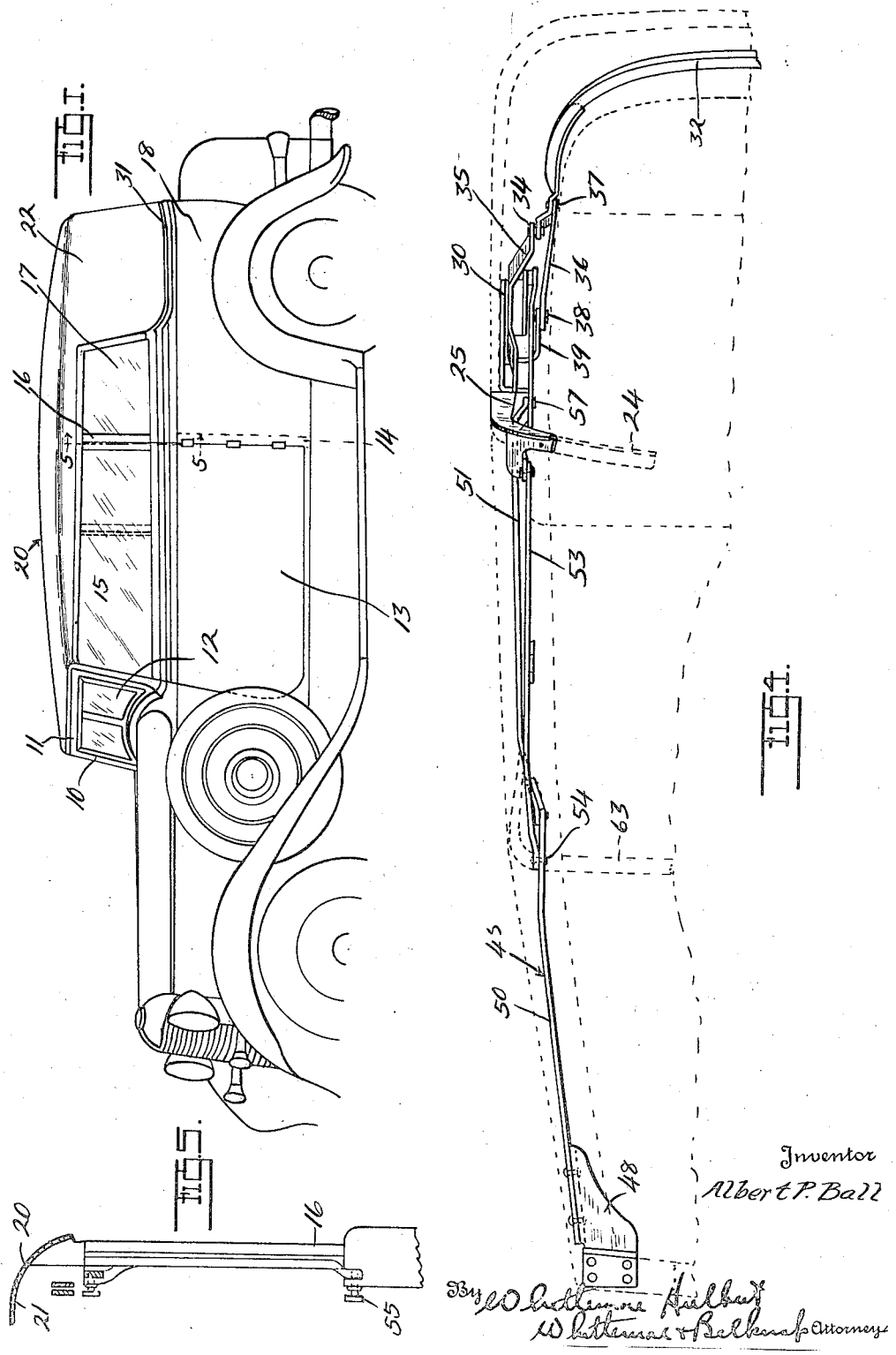

2,055,889

UNITED STATES PATENT OFFICE 2,055,889

VEHICLE TOP CONSTRUCTION

Albert P. Ball, Detroit, Mich., assignor to Briggs Manufacturing Company, Detroit, Mich., a corporation of Michigan Application September 26, 1932, Serial No. 634,977

4 Claims. (Cl. 296—107)

This invention relates to vehicle bodies of the closed type in which the superstructure or top assembly is capable of being collapsed to permit the vehicle to be converted into an open car when desired.

The steadily increasing demand for the more complicated convertible type body has introduced to the trade the problem of manufacturing these bodies at a sufficiently low cost to permit employing the same in the production of vehicles in the relatively low priced class. The difficulty of producing convertible vehicle bodies on a production basis can be appreciated when considering that aside from the cost of manufacture, the appearance of the top structure when in both extended and collapsed positions as well as the facility with which the same may be moved to these positions must be taken into consideration.

The present invention contemplates reducing the cost of manufacture of convertible bodies by providing a collapsible top construction composed of a relatively few number of parts capable of being readily manufactured, assembled and installed.

Another advantageous feature of the present invention which contributes materially to the commercial acceptability of convertible bodies resides in arranging the relatively few parts of the top construction thereof in such a manner as to facilitate actuation of the top structure from both its collapsed and extended positions.

In addition to the foregoing, the present invention offers the possibility of imparting a neat streamlined appearance to convertible vehicle bodies in the collapsed position of the top thereof by arranging the several interconnected parts of the latter in such a manner as to insure folding of the same into a compact space.

A still further advantageous feature of the present invention resides in the provision of a collapsible top structure wherein the several parts thereof cooperate in their extended positions to form a rigid and durable top unit.

The foregoing as well as other objects will be made more apparent as this description proceeds, especially when considered in connection with the accompanying drawings, wherein:

Figure 1 is a fragmentary perspective view of a vehicle having a convertible body equipped with a collapsible top constructed in accordance with this invention;

Figure 2 is a longitudinal sectional view through the top structure illustrating the several cooperating parts thereof in extended positions;

Figure 3 is a sectional view showing the relative positions of the several parts of the top structure illustrated in Figure 2 in their collapsed positions;

Figure 4 is a top plan view of the top structure illustrated in Figure 2 with the top covering removed for the sake of clearness;

Figure 5 is a sectional view taken on the line 5—5 of Figure 1;

Figure 6 is a sectional view taken on the line 6—6 of Figure 2.

While it will be apparent as this description proceeds that the top structure forming the subject matter of this invention may be employed in association with various types of vehicle bodies, nevertheless, I have shown the same herein for the purpose of illustration as applied to a convertible close-couple sedan. As will be observed from Figure 1 of the drawings, the body proper illustrated herein is of conventional design in that it is provided at the front end thereof with the usual upwardly extending body pillars 10 connected at the upper ends thereof by means of a header 11 forming with the body pillars a space for receiving a suitable windshield 12. In accordance with conventional design, the body is provided with opposite side doors 13 hingedly connected along the rear edges thereof to the rear body pillars 14 and fashioned at the forward ends thereof to abut the front body pillars 10. Mounted within each of the doors 13 for sliding movement relative thereto is a glass panel 15 having the forward edges thereof engageable with the front body pillars 10 and having the upper edges thereof engageable with the sides of the collapsible top structure in any suitable manner to form a substantially tight seal therewith. The rear edges of the glass panels 15 slidably engage removable pillars 16 forming in effect continuations of the rear body pillars 14 and fashioned at the rear side thereof to slidably receive the glass panels 17 supported in the rear quarter panels 18 of the body. The top edges of the panels 17 preferably engage the sides of the top structure in its extended position in such a manner as to form a substantially tight seal therewith, and the rear edges thereof preferably slidably engage the legs of the main top supporting bow which will be more fully hereinafter described. Briefly stated, the above construction is such that when the top structure is in its extended position, the same will cooperate with the glass panels to form in effect a closed body.

The top or superstructure of the body forming the subject matter of this invention is designated generally herein by the reference character 20 and as previously stated is so constructed and assembled upon the body as to permit the same to be collapsed from the extended position shown in Figure 2 to the folded position illustrated in Figure 3. In detail, the top structure comprises a suitable top material 21 secured to the collapsible top structure to be presently described in such a manner as to form a hood portion 22 in rear of the glass panels 17 and a forwardly extending portion 23 normally secured to the body header 11. The collapsible frame structure for supporting the aforesaid portions of the top material comprises a main substantially U-shaped bow 24 extending transversely of the body in such a position that the leg portions 25 thereof form abutments for the rear edges of the glass panels 17 when the bow is extended as shown in Figure 2. The lower ends of the leg portions 25 of the bow are formed with plate-like extensions 26 projecting below the upper edges 27 of the body proper into the space 28 provided at opposite sides of the body between the inner and outer rear quarter panels. The extreme lower ends of the extensions 26 are pivotally connected as at 29 to brackets 30 located within the spaces 28 and rigidly secured in any suitable manner to the body. As will be observed from Figure 3, the pivotal connections 29 are located a substantial distance below the top edges 27 of the body proper and the rear quarter panels 18 are recessed as at 31 so that when the bow 24 is folded, the same assumes an elevation substantially below the aforesaid top edges of the body proper.

For supporting the hood portion 22 of the top in its extended position, a second substantially U-shaped bow 32 is provided extending transversely of the vehicle and inclined rearwardly with respect to the bow 24 to such an extent as to impart the desired contour to the hood portion aforesaid of the top. The lower ends of the leg portions 33 of the bow 32 are pivotally connected as at 34 to suitable arms 35 inclined upwardly and rearwardly from the extensions 26 of the bow 24. The arrangement is such that when the bow 24 is swung rearwardly about the axis of the pivotal connections 29, the arm 35 swings downwardly about the same axis, and in so doing, carries the leg portions 33 of the bow 32 into the spaces 28 between the rear quarter panels. Movement of the bow 32 from the position thereof shown in Figure 2 to the position of the same illustrated in Figure 3 is accurately controlled by means of suitable links 36 associated with the leg portions 33 of the aforesaid bow. The upper ends of the links 36 are pivotally connected to the legs 33 of the bow 32 at points spaced above the pivotal connections 34 of the latter with the extensions 26, and the lower ends of the links have a pivotal connection 38 with suitable brackets 39 fixed to the brackets 30. The pivotal connections 38 are spaced directly above the pivots 29, with the result that upon rearward swinging movement of the bow 24, the pivotal connections 34 between the bow 32 and extensions 26 on the bow 24 travel in an arc having the pivots 29 as its center, while the pivotal connections 37 between the upper ends of the links 36 and legs 33 of the bow 22 travel in an arc having the pivots 38 as its center. It will be apparent from the foregoing that the links 36 not only compel the bow 33 to assume a predetermined path of travel when moved from its extended to its collapsed position, but also serve to accurately guide upward movement of the bow 32 when the top structure is moved to its extended position. In this connection, attention is called to the fact that the links 36 preferably have a slotted connection with the pivot 38 so as not to obstruct final upward swinging movement of the bow 32 about its pivotal connections 34 with the extensions 26 and thereby insure stretching the back panel 40 of the hood portion of the top taut.

The forwardly projecting portion 23 of the top is supported by suitable frame work 45 comprising a top header 46 extending transversely of the body and normally detachably secured to the body header 11 by any suitable type of fastening devices (not shown herein). The opposite ends of the header 46 are operatively connected to the corresponding legs of the main top supporting bow 24 by means of collapsible side rails 47 having the forward ends rigidly secured to the header 46 by means of the brackets 48 and having portions adjacent the rear ends thereof pivotally connected as at 49 to the legs 25 of the bow 24. In order to provide for collapsing the side rails, each of the latter are formed of a pair of links 50 and 51 having the adjacent ends pivotally interconnected as at 52 in such a manner as to provide for downward movement of the aforesaid adjacent ends of the links during folding of the top structure. The pivotal connections 52 between adjacent ends of the links are offset above the latter so as to resist folding of the same in the manner specified above. Accidental collapsing of the rails 47 is further prevented by employing suitable side bars 53 having the forward ends thereof pivotally connected to the links 50 adjacent the rear ends thereof as at 54 and having the rear ends pivotally connected to the legs 25 of the bow 24 substantially above the pivotal connections 49. It will be observed from the foregoing that the links 53, in addition to performing the above function, also serve to retard the collapsing movement of the links 50 and 51, or, in other words, prevents the frame structure 45 from falling into collapsed position upon folding the side rails 47. While the aforesaid means is sufficient for preventing accidental collapsing of the frame work 45, nevertheless, it will be noted from Figure 2 that the removable pillars 16 for guiding the glass panels 15 and 17 actually prevents folding of the frame work 45 when in assembled relation therewith. In detail, the lower ends of the pillars are clamped within suitable recesses formed in the body by means of the thumb screws 55, and the upper ends thereof are similarly clamped to the rear links 51 of the side rails 47. The above arrangement is such as to permit ready removal of the pillars 16 when it is desired to collapse the top.

In accordance with the present invention, collapsing of the top structure is materially facilitated by the provision of links 56 having the upper ends pivotally connected as at 57 to the extreme rear ends of the links 51 at points spaced rearwardly from the pivotal connections 49 and having the lower ends pivotally connected as at 58 to the fixed brackets 30 hereinbefore described. The pivotal connections 58 between the lower ends of the links and brackets 30 are arranged slightly below and rearwardly of the pivotal connections 29 for the top supporting bow 24. Inasmuch as the pivots 49 for the rear ends of the links 51 are carried by the bow 24, it will be apparent that rearward movement of the bow about the pivots 29 from the position thereof shown in Figure 2 effects movement of the pivots 49 through an arc developed by the pivots 29, and in addition compels the extreme rear end portions of the links 51 to swing through an arc developed from the pivots 58. Due to the relationship between the pivots 29 and 58 hereinbefore described, it will be apparent that the aforesaid movement of the bow will effect a rocking movement of the links 51 about the pivots 49 in the direction of the arrow 59 and thereby cause a folding of the side rails 47 at the pivots 52. From the foregoing description, it necessarily follows that the reverse action takes place when the bow 24 is moved from its collapsed position to its extended position so that the links 56 not only facilitate collapsing of the top, but also expedite moving the top structure from its folded position to its extended position. Moreover, the links 56 cooperate with the links 36 hereinbefore described in controlling movement of the several units of the top structure from one of the aforesaid positions to the other. In other words, due to the manner in which both pairs of links 56 and 36 are instituted in the assembly, the same effect movement of the several parts of the top structure in timed relation to each other so as to insure expedient and proper manipuation of the top structure.

It will be observed from Figure 2 of the drawings that the connections of the lower ends of the links 56 with the brackets 30 are of the slotted type so as to afford the necessary freedom of movement of the bow 24 to its extended position in order to maintain the section of the top material between this bow and the bow 32 taut. In this connection, it is to be noted that the extent of movement of the bow 24 to its upright position is accurately controlled herein by providing adjustable elements 60 on the plates 26 for engaging the portions 61 of the fixed brackets 39. The top material extending from the header 46 to the bow 24 is maintained taut in the extended position of the top by means of a secondary bow 63 pivotally connected as at 64 to the stabilizing links 53 previously described.

*Operation*

Referring now to the operation of the top structure and assuming that it is desired to move the same from its upright position shown in Figure 2 to its collapsed position illustrated in Figure 3, it will be noted that the operator merely releases the header 46 from engagement with the body header 11, and in addition removes the pillars 16 from assembled relation with the body. The bow 24 is then moved rearwardly about the pivots 29, and the side rails 47 are simultaneously collapsed through the medium of the levers 46 in the manner hereinbefore described. Initial downward swinging movement of the bow 24, in addition to moving the side rails 47 toward their collapsed position, also simultaneously effects downward diagonal movement of the bow 32 in a path controlled by the links 36. Due to the peculiar arrangement of parts shown in Figure 2, continued movement of the bow about its pivots 29 in the aforesaid direction causes the frame 45 of the top structure to assume a position substantially within the area of the bow 24 and effects a movement of this unit over the bow 32 so that the latter lies within the unit in the manner clearly shown in Figure 3. Collapsing the top structure in the above manner provides for obtaining a neat and compact fold as exemplified by Figure 3 of the drawings since the bow 32 does not appreciably add to the vertical height of the folded top structure. This arrangement renders it possible to locate substantially the entire top structure below the upper edges 27 of the body in a construction wherein only a relatively shallow recess 31 is formed in the body. In order to insure a neat and compact fold, the body may be provided with a vertically extending recess 65 in rear of the back seat thereof for receiving the excess portions of the top material as clearly shown in Figure 3.

Assuming now that the top is in its folded position shown in Figure 3 and it is desired to move the same to its extended position, the operator merely grasps the bow 24 and swings the same forwardly about its pivotal connections 29 with the body. In so doing, the bow 32 is moved by the levers 36 to its extended position, and the forward frame structure 47 is also moved to its extended position by the levers 56. The aforesaid movement of the several parts of the top structure is materially facilitated herein by the provision of spiral springs 67 having the inner ends fixed to the pivots 29 and having the outer ends anchored in the bow 24.

What I claim as my invention is:

1. A collapsible top for vehicle bodies comprising, an inverted substantially U-shaped top supporting member mounted for swinging movement longitudinally of the body, means extending forwardly from said member for supporting the portions of the top in advance of the latter including a frame member pivotally connected to the top supporting member and collapsible to a position adjacent the same, means operable upon movement of one of said members to compel movement of both members in timed relation to each other, a second inverted substantially U-shaped top supporting member pivotally connected at the lower ends to the first mentioned member, and means for controlling movement of said second U-shaped member upon movement of both the frame and first named top supporting member to permit a portion of the second U-shaped member to pass transversely through the first-named U-shaped top supporting member.

2. A collapsible top for a vehicle body comprising, a main top supporting bow, a second top supporting bow spaced from the bow aforesaid and having a portion proportioned to pass through the main bow, means mounting said bows for swinging movement relative to each other longitudinally of the body, and means operable in dependence upon movement of the bows in one direction to control the movement of the second bow to permit the passage of a portion of the same through the main bow, said means including a link having one end pivotally connected to the second bow at a point spaced from the axis of swinging movement of this bow and having the other end pivotally connected to a relatively fixed part of the vehicle body.

3. A collapsible top for vehicle bodies comprising, a main top supporting bow mounted for swinging movement about a fixed axis and having portions extending rearwardly from the lower ends of the legs thereof, a second top supporting bow having the lower ends of the leg portions pivotally connected to the rearwardly projecting portions of the main bow, and means for guiding the second bow upon movement of the main bow including a link normally extending across the axis of the pivotal connection between the bows and having the upper end pivotally connected to the second bow at a point spaced above the latter pivotal connection and having the lower end pivotally connected to a part of the body fixed relative to the bows.

4. A collapsible top for a vehicle body comprising, a main top supporting bow, a second top supporting bow spaced from the bow aforesaid, a flexible top covering connecting the bows, a pivotal connection between the two bows, said flexible top covering and said pivotal connection constituting the sole connection between the bows, and means for guiding the second bow upon movement of the main bow including a link normally extending across the pivotal connection between the bows with the upper end pivotally connected to the second bow at a point spaced above the latter pivotal connection and with the lower end pivotally connected to a part fixed relative to the bows.

ALBERT P. BALL.